(12) United States Patent
Watanabe (10) Patent No.: US 8,400,725 B2
(45) Date of Patent: Mar. 19, 2013

(54) STORAGE DEVICE AND METHOD FOR CONTROLLING PROJECTION AMOUNT OF HEAD

(75) Inventor: Daisuke Watanabe, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 92 days.

(21) Appl. No.: 13/031,024

(22) Filed: Feb. 18, 2011

(65) Prior Publication Data

US 2011/0292532 A1 Dec. 1, 2011

(30) Foreign Application Priority Data

May 31, 2010 (JP) .................................. 2010-124926

(51) Int. Cl.
*G11B 27/36* (2006.01)
*G11B 21/02* (2006.01)

(52) U.S. Cl. ........................................... 360/31; 360/75

(58) Field of Classification Search .................. None
See application file for complete search history.

(56) References Cited

U.S. PATENT DOCUMENTS

| | | | |
|---|---|---|---|
| 7,068,468 B2 | 6/2006 | Kamijima | |
| 7,385,777 B2 | 6/2008 | Satoh et al. | |
| 7,492,543 B2 | 2/2009 | Mitsunaga et al. | |
| 7,692,890 B2 | 4/2010 | Ikeda | |
| 7,697,232 B2 | 4/2010 | Yokota et al. | |
| 7,969,681 B2 | 6/2011 | Satoh et al. | |
| 2003/0099054 A1 | 5/2003 | Kamijima | |
| 2007/0053104 A1 | 3/2007 | Satoh et al. | |
| 2007/0247744 A1 | 10/2007 | Satoh et al. | |
| 2008/0100950 A1 | 5/2008 | Mitsunaga et al. | |
| 2008/0239551 A1 | 10/2008 | Yokota et al. | |
| 2009/0201598 A1 | 8/2009 | Masuda et al. | |
| 2009/0296262 A1 | 12/2009 | Ikeda | |

FOREIGN PATENT DOCUMENTS

| | | |
|---|---|---|
| JP | 2003-168274 A | 6/2003 |
| JP | 2007-066488 | 3/2007 |
| JP | 2007-294001 | 11/2007 |
| JP | 2008-112515 A | 5/2008 |
| JP | 2008-243249 A | 10/2008 |
| JP | 2009-187601 A | 8/2009 |
| JP | 2009-289345 | 12/2009 |

OTHER PUBLICATIONS

Notice of Reasons of Rejection mailed by the Japan Patent Office on Aug. 2, 2011 in the corresponding Japanese patent application No. 2011-143301 in 4 pages.
Explanation of Non-English Language References.
Decision to Grant a Patent mailed by the Japanese Patent Office on Jun. 7, 2011 in the corresponding Japanese patent application No. 2010-124926 in 3 pages.

*Primary Examiner* — Regina N Holder
(74) *Attorney, Agent, or Firm* — Knobbe, Martens, Olson & Bear, LLP (57) ABSTRACT

According to one embodiment, a storage device includes a recording medium, a driving module, a head, a conductive body, a write-verify module, and a projection amount controller. A conductive body is mounted on the head, and changes a projection amount of the head by thermally expanding the head with heat from a current carried by the conductive body. The write-verify module executes a write-verify check to check whether content written in any location on the recording medium is correct when the driving module starts rotating the recording medium. The projection amount controller controls the projection amount of the head by adding a first value to a current in a steady state carried by the conductive body if the content is correct, and adding a second value with an absolute value greater than that of the first value to the current in the steady state if the content is not correct.

4 Claims, 9 Drawing Sheets

| Addr. | | DESCRIPTION | |
|---|---|---|---|
| 0010h | | APPLICATION TIME T1 [min] | ⎫ |
| 0011h | | Iw/OS ADDITION VALUE 1 | |
| 0012h | | READ HEATER POWER ADDITION VALUE 1 | |
| 0013h | | WRITE HEATER POWER ADDITION VALUE 1 | |
| 0014h | | APPLICATION TIME T2 [min] | |
| 0015h | | Iw/OS ADDITION VALUE 2 | |
| 0016h | | READ HEATER POWER ADDITION VALUE 2 | |
| 0017h | TABLE 1: NORMAL CORRECTION TABLE | WRITE HEATER POWER ADDITION VALUE 2 | T1 |
| 0018h | | APPLICATION TIME T3 [min] | |
| 0019h | | Iw/OS ADDITION VALUE 3 | |
| 001Ah | | READ HEATER POWER ADDITION VALUE 3 | |
| 001Bh | | WRITE HEATER POWER ADDITION VALUE 3 | |
| 001Ch | | APPLICATION TIME T4 [min] | |
| 001Dh | | Iw/OS ADDITION VALUE 4 | |
| 001Eh | | READ HEATER POWER ADDITION VALUE 4 | |
| 001Fh | | WRITE HEATER POWER ADDITION VALUE 4 | ⎭ |
| 0020h | | APPLICATION TIME T1 [min] | ⎫ |
| 0021h | | Iw/OS ADDITION VALUE 1 | |
| 0022h | | READ HEATER POWER ADDITION VALUE 1 | |
| 0023h | | WRITE HEATER POWER ADDITION VALUE 1 | |
| 0024h | | APPLICATION TIME T2 [min] | |
| 0025h | | Iw/OS ADDITION VALUE 2 | |
| 0026h | | READ HEATER POWER ADDITION VALUE 2 | |
| 0027h | TABLE 2: ACTIVE CORRECTION TABLE (FOR TEMPERATURE OTHER THAN LOW TEMPERATURE) | WRITE HEATER POWER ADDITION VALUE 2 | T2 |
| 0028h | | APPLICATION TIME T3 [min] | |
| 0029h | | Iw/OS ADDITION VALUE 3 | |
| 002Ah | | READ HEATER POWER ADDITION VALUE 3 | |
| 002Bh | | WRITE HEATER POWER ADDITION VALUE 3 | |
| 002Ch | | APPLICATION TIME T4 [min] | |
| 002Dh | | Iw/OS ADDITION VALUE 4 | |
| 002Eh | | READ HEATER POWER ADDITION VALUE 4 | |
| 002Fh | | WRITE HEATER POWER ADDITION VALUE 4 | ⎭ |
| 0030h | | APPLICATION TIME T1 [min] | ⎫ |
| 0031h | | Iw/OS ADDITION VALUE 1 | |
| 0032h | | READ HEATER POWER ADDITION VALUE 1 | |
| 0033h | | WRITE HEATER POWER ADDITION VALUE 1 | |
| 0034h | | APPLICATION TIME T2 [min] | |
| 0035h | | Iw/OS ADDITION VALUE 2 | |
| 0036h | | READ HEATER POWER ADDITION VALUE 2 | |
| 0037h | TABLE 3: ACTIVE CORRECTION TABLE (FOR LOW TEMPERATURE) | WRITE HEATER POWER ADDITION VALUE 2 | T3 |
| 0038h | | APPLICATION TIME T3 [min] | |
| 0039h | | Iw/OS ADDITION VALUE 3 | |
| 003Ah | | READ HEATER POWER ADDITION VALUE 3 | |
| 003Bh | | WRITE HEATER POWER ADDITION VALUE 3 | |
| 003Ch | | APPLICATION TIME T4 [min] | |
| 003Dh | | Iw/OS ADDITION VALUE 4 | |
| 003Eh | | READ HEATER POWER ADDITION VALUE 4 | |
| 003Fh | | WRITE HEATER POWER ADDITION VALUE 4 | ⎭ |

STORAGE DEVICE AND METHOD FOR CONTROLLING PROJECTION AMOUNT OF HEAD

CROSS-REFERENCE TO RELATED APPLICATIONS

This application is based upon and claims the benefit of priority from Japanese Patent Application No. 2010-124926, filed May 31, 2010, the entire contents of which are incorporated herein by reference.

FIELD

Embodiments described herein relate generally to a storage device and a method for controlling a projection amount of a head.

BACKGROUND

Conventionally, in storage devices represented by a magnetic disk device, the floating amount of a head relative to a recording surface of a recording medium such as a magnetic disk must be reduced to achieve high recording density. In recent years, the floating amount of extremely small order has been achieved, e.g., equal to or less than 10 nanometers.

However, when the floating amount of the head is reduced, collisions between the head and minute protrusions on the magnetic disk surface are likely to occur. Further, a clearance between the head and the magnetic disk surface varies for different heads within a mechanical tolerance range. Therefore, when the medium contact is taken into consideration, the floating amount cannot be set lower than the tolerance range.

Accordingly, a method is proposed in which the clearance between the head and the recording surface of the magnetic disk is controlled by incorporating a heater in the head and utilizing the projection phenomenon of the head floating surface caused by thermal expansion when current is supplied to the heater.

In general, the environmental temperature of a storage device is lower than the temperature of the steady state immediately after a recording medium in the storage device starts rotating, for example, when the power of the storage device is turned ON and the storage device starts operating or when the recording medium is returned from the rotation-stopped state, such as a power saving mode, with the power of the storage device already turned ON. Accordingly, it is known that the floating amount of the head in this case becomes higher than the floating amount in the steady state. For example, the floating amount of the head immediately after the start-up of the storage device is approximately 0.4 to 0.6 nanometers higher than the floating amount in the steady state. It is also known that it takes approximately 10 minutes to reach a state, namely, a steady state, in which the storage device can be suitably operated at the values set in advance at the design stage, testing step, and the like.

As mentioned above, immediately after the cold start-up (immediately after the start-up of the device that has been left unpowered or unloaded for a predetermined period of time), write/read characteristics (referred to as start-up characteristics) deteriorate because the floating position of the head comprising elements (writing element and reading element) to which a lubricant agent for the recording medium or the like sticks is elevated. If the start-up characteristics deteriorate to a great extent, the floating position of the head may be elevated by approximately one to two nanometers.

Thus, a method is proposed in which a set value for write current related current (write current (Iw) and overshoot (O/S)) and a set value (read/write heater) for a dynamic flying height (DFH) are adjusted during a fixed period of time immediately after the start-up to prevent the start-up characteristics.

Here, the start-up characteristics must be detected and isolated based on the characteristic deterioration to adjust the set values more effectively. However, the characteristic deterioration is affected by the combination of a medium and head, and the characteristics vary depending on the head. Accordingly, it is difficult to distinguish a head that has deteriorated immediately after the start-up.

BRIEF DESCRIPTION OF THE SEVERAL VIEWS OF THE DRAWINGS

A general architecture that implements the various features of the invention will now be described with reference to the drawings. The drawings and the associated descriptions are provided to illustrate embodiments of the invention and not to limit the scope of the invention.

FIG. 6 is an exemplary schematic diagram of a data structure of a correction table in the embodiment;

DETAILED DESCRIPTION

In general, according to one embodiment, a storage device, comprises a recording medium, a driving module, a head, a conductive body, a write-verify module, and a projection amount controller. Data can be written into and read out from the recording medium. The driving module is configured to drive and rotate the recording medium. The head comprises a reading element and a writing element, and is configured to float over the recording medium driven and rotated by the driving module to read data using the reading element and to write data using the writing element. The conductive body is mounted on the head, and is configured to change a projection amount of the head relative to the recording medium by thermally expanding the head with heat from a current carried by the conductive body. The write-verify module is configured to execute a write-verify check to check whether content written in any location on the recording medium by the head is correct if the driving module starts rotating the recording medium upon power being turned ON or upon a request for restoration from a rotation-stopped state of the recording medium. The projection amount controller is configured to control the projection amount of the head by adding a first value to a current in a steady state carried by the conductive body if the content is correct as a result of the checking by the write-verify module, and is configured to control the projection amount of the head by adding a second value with an absolute value greater than that of the first value to the current in the steady state carried by the conductive body if the content is not correct as a result of the checking.

Figure 1:
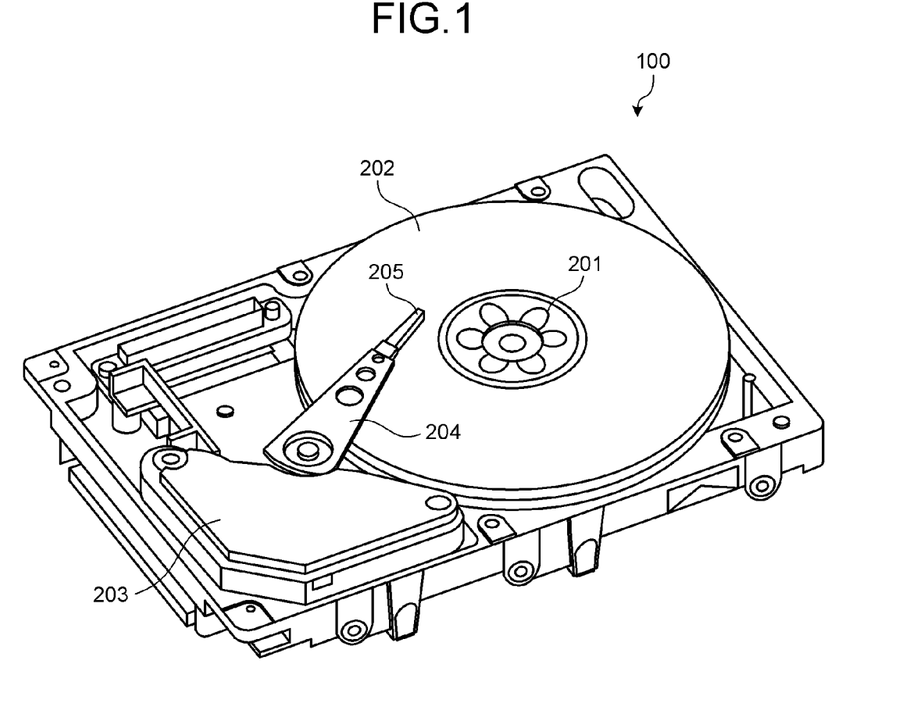
FIG. 1 is an exemplary external perspective view of a magnetic disk device according to an embodiment.

FIG. 1 is an external perspective view of a magnetic disk device 100 according to an embodiment. As illustrated in FIG. 1, the magnetic disk device 100 known as a hard disk drive (HDD) comprises a magnetic disk 202 that is a recording medium rotated by a spindle motor (SPM) 201 that is a driving module. The magnetic disk device 100 also comprises a head actuator 204 driven by a voice coil motor (VCM) 203 relative to the magnetic disk 202, and a head slider 205 attached to a distal end of the head actuator 204.

Figure 2:
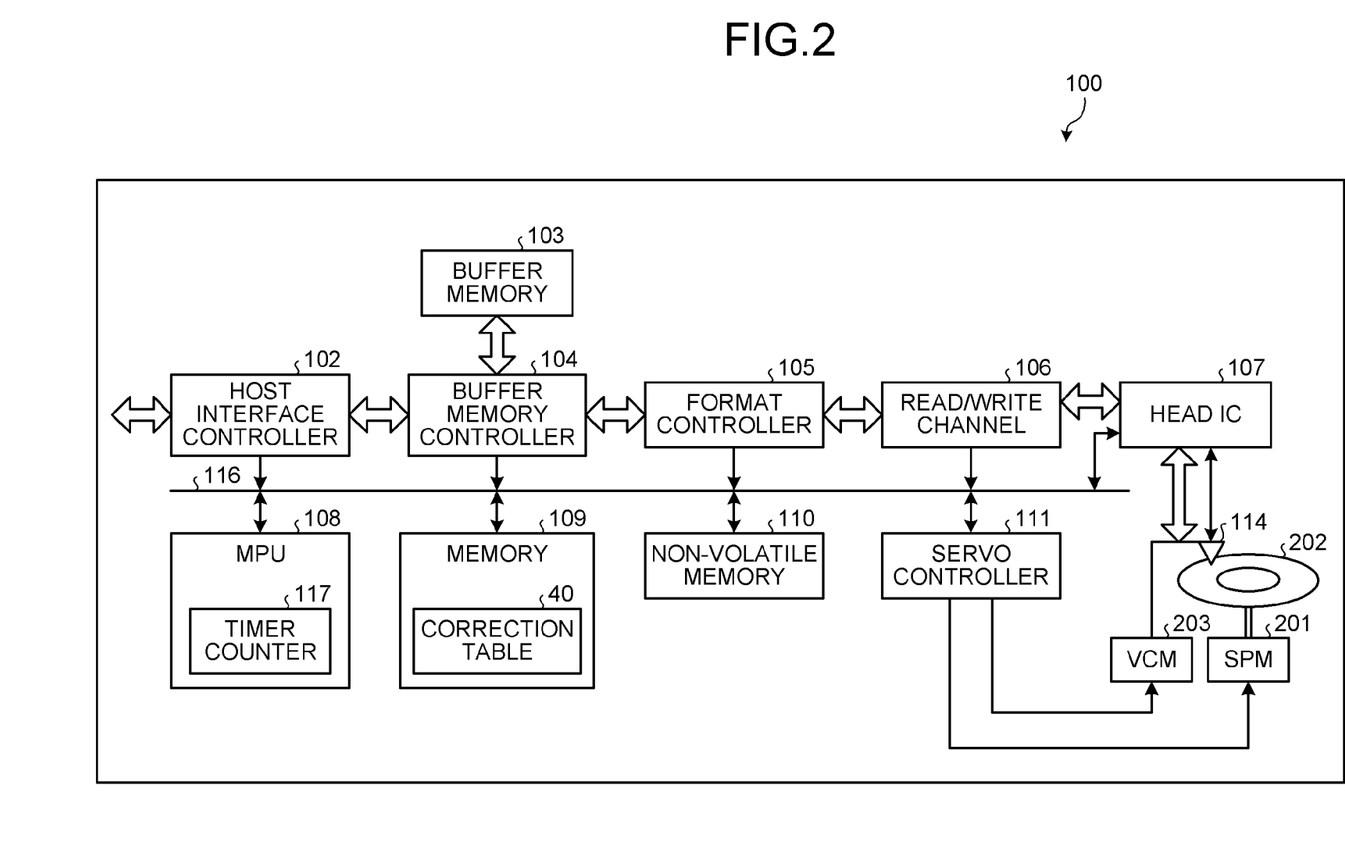
FIG. 2 is an exemplary block diagram of a controlling system of the magnetic disk device in the embodiment.

FIG. 2 is a block diagram of a controlling system of the magnetic disk device 100. As illustrated in FIG. 2, the magnetic disk device 100 comprises a upper interface controller 102 configured to control a upper interface connected to an upper device, a buffer memory 103 configured to store therein data received from the upper device, and a buffer memory controller 104 configured to control the buffer memory 103.

The magnetic disk device 100 also comprises a format controller 105 configured to perform error correction code (ECC) calculation and the like on the received data, a read/write channel 106 configured to demodulate the read data and amplify the read data to a predetermined value, a head integrated circuit (IC) 107 configured to control an output from a head 114 mounted on the head slider 205, and the like. The magnetic disk device 100 writes data received from the upper device into the magnetic disk 202 and reads data therefrom.

The magnetic disk device 100 also comprises a microprocessing unit (MPU) 108. The MPU 108 is connected to a memory 109 configured to store therein a control program (firmware program) and control data, and to a non-volatile memory 110 configured to store therein a control program and/or the like, via a bus 116. The MPU 108 is also connected to the upper interface controller 102, the buffer memory controller 104, the format controller 105, the read/write channel 106, and the like via the bus 116. The memory 109 is configured to store therein a correction table 40, which will be described later.

The MPU 108 comprises a timer counter 117 used to measure a start-up time of the magnetic disk device 100, for example. The timer counter 117, for example, may be implemented as a function of a program operated on the MPU 108. The timer counter 117 may also be an independent circuit connected to the MPU 108 via the bus 116, in addition to the configuration provided in the MPU 108 as illustrated in FIG. 2. A timer counter of the upper device connected to the magnetic disk device 100 may also be used. In other words, a timer counter may be provided by storing values of the timer counter notified by the upper device in the MPU 108, for example.

The MPU 108, the memory 109, the upper interface controller 102, the buffer memory controller 104, the read/write channel 106, and the like may also be formed as one controlling device, such as a large-scale integration (LSI) device.

The magnetic disk device 100 also comprises a servo controller 111. The servo controller 111 controls the voice coil motor (VCM) 203 and the spindle motor (SPM) 201.

When the upper interface controller 102 receives a write command and write data from the upper device, the MPU 108 analyzes the content of the write command and stores the write data in the buffer memory 103 as necessary. The format controller 105 then converts the write data to a predetermined data format, and adds an ECC code to the write data by performing ECC processing. After scrambling, run-length limited (RLL) code conversion, and write compensation are performed in the read/write channel 106, the write data is written in the magnetic disk 202 by a writing element of the head 114 via the head IC 107.

At this time, a head positioning signal is provided from the MPU 108 to the servo controller 111. Accordingly, a track following control is performed by driving the head actuator 204 by using the voice coil motor 203, seeking the head 114, and positioning the head 114 on a target track instructed by the command.

When the upper interface controller 102 receives a read command from the upper device, the MPU 108 decodes the read command. A reading element of the head 114 then reads a signal based on the decoded result via the head IC 107. The read signal is then amplified by a preamplifier, supplied to a read demodulating system of the read/write channel 106, and demodulated as read data by using partial response maximum likelihood (PRML) detection, for example. The format controller 105 then detects and corrects errors in the read data by performing the ECC processing, for example, and the read data is buffered in the buffer memory 103. Consequently, the upper interface controller 102 transfers the read data to the upper device.

Figure 3:
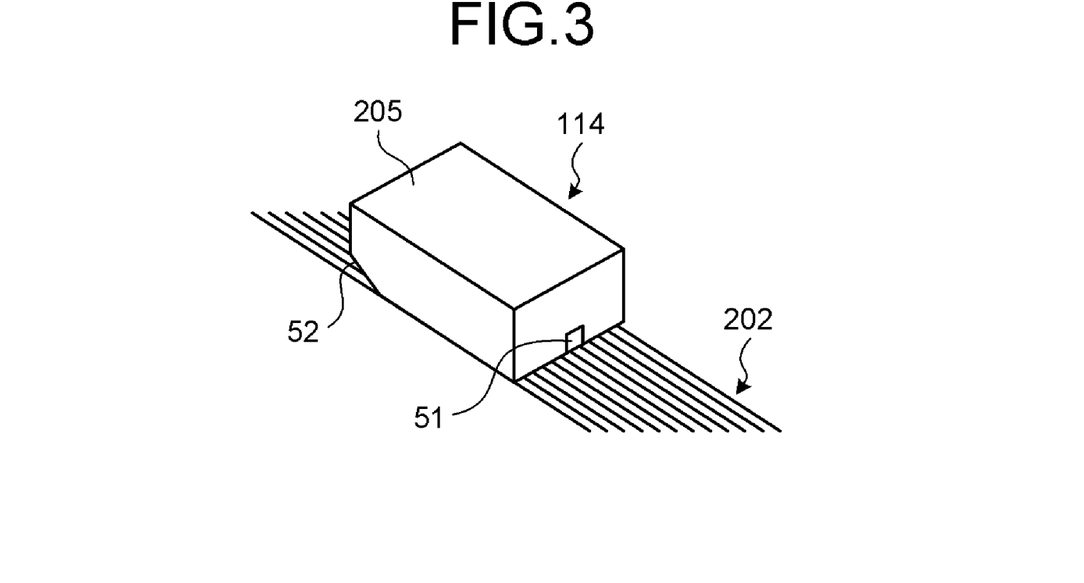
FIG. 3 is an exemplary perspective view of a head in the embodiment.
Figure 4:
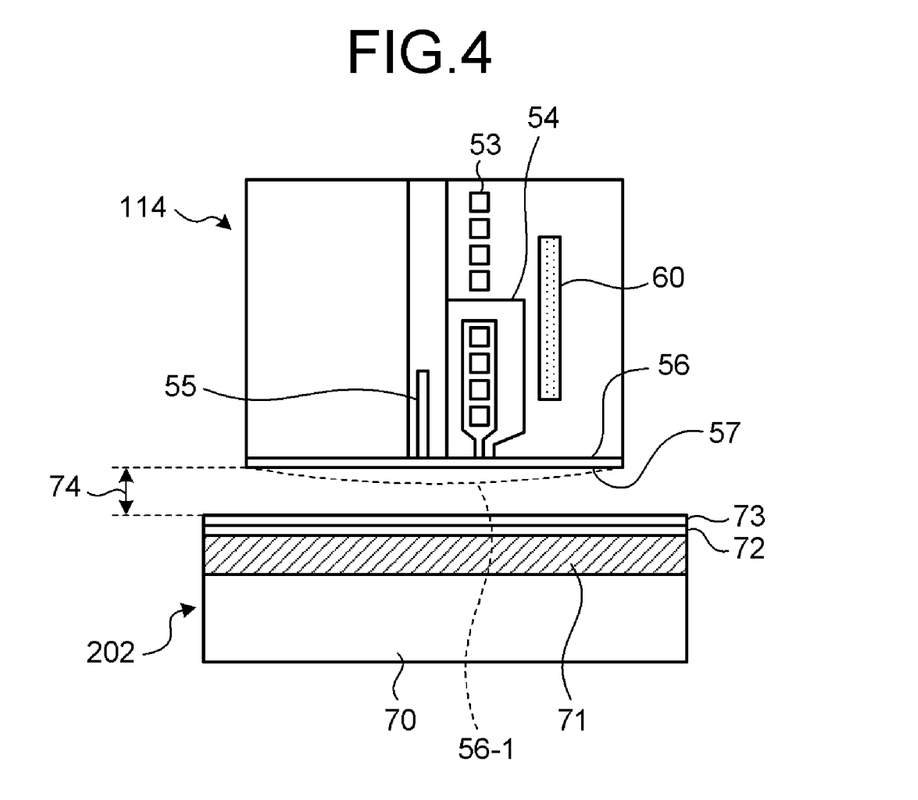
FIG. 4 is an exemplary sectional view of the head viewed from a track direction in the embodiment.

FIG. 3 is a perspective view of the head 114. FIG. 4 is a sectional view of the head 114 viewed from a track direction. As illustrated in FIG. 3, the head 114 is mounted on the head slider 205 made of a ceramic material, for example. A tapered surface 51 is formed at a distal end side of the floating surface of the head slider 205 facing the magnetic disk 202, and an air circulation groove 52 is also formed on a floating surface in the track direction.

As illustrated in FIG. 4, the head 114 made of a ceramic, for example, comprises a recording coil 53 and a recording core 54 as a writing element. The head 114 also comprises a reading element 55 placed adjacent to the recording coil 53. A giant magneto-resistance element (GMR element) and a tunneling magneto-resistance element (TMR element) are used as the reading element 55.

The surface of the head 114 facing the magnetic disk 202 is an air bearing surface (ABS) 56, and a protective film 57 is formed on the surface.

As illustrated in FIG. 4, the magnetic disk 202 is formed by depositing a recording film 71 on a substrate 70, depositing a protective film 72 on the recording film 71, and further applying a lubricant agent 73 on the surface.

In addition, the head 114 comprises a heater 60 placed near the recording core 54. When the heater 60 is heated by supplying current thereto, the head 114 (such as a sealing material) is thermally expanded, and the ABS 56, which is the floating surface of the head 114, is expanded and projected toward a side of the magnetic disk 202 as illustrated by a head surface 56-1 in broken lines. Accordingly, a clearance 74 between the head 114 and the magnetic disk 202 is defined as a gap from the lower end of the reading element 55 to the upper surface of the lubricant agent 73 for the magnetic disk 202. The head 114 is also thermally expanded when the recording coil 53 is heated by supplying current thereto. Accordingly, the ABS 56, which is the floating surface of the head 114, is expanded and projected toward the side of the magnetic disk 202 as illustrated by the head surface 56-1 in broken lines.

In the magnetic disk device immediately after cold start-up (immediately after start-up of the device that has been left unpowered or unloaded for a predetermined period of time), the write/read characteristics (referred to as start-up characteristics) deteriorate because a floating position of the head is elevated while a lubricant agent for the magnetic disk or the like sticks to the elements (writing element and reading element) of the head. If the start-up characteristics deteriorate to a great extent, the floating position of such a head is elevated by as much as one to two nanometers.

To prevent deterioration in the write/read characteristics caused by the elevation of the floating position of the head 114 as described above, the magnetic disk device 100 according to the embodiment has a structure of adjusting a set value for a write current related current (Iw and overshoot (O/S)) and a set value for a DFH (read/write heater) during a fixed period of time immediately after the start-up. More specifically, in the start-up state immediately after the start-up, the start-up characteristics are enhanced by adjusting the DFH set value. Accordingly, by checking the degree of characteristic deterioration using write verify, the head that has deteriorated can be distinguished immediately after the start-up.

Among the functions realized by executing the firmware program of the MPU 108, a distinguishing function for preventing the deterioration in the start-up characteristics as described above will now be described.

Figure 5:
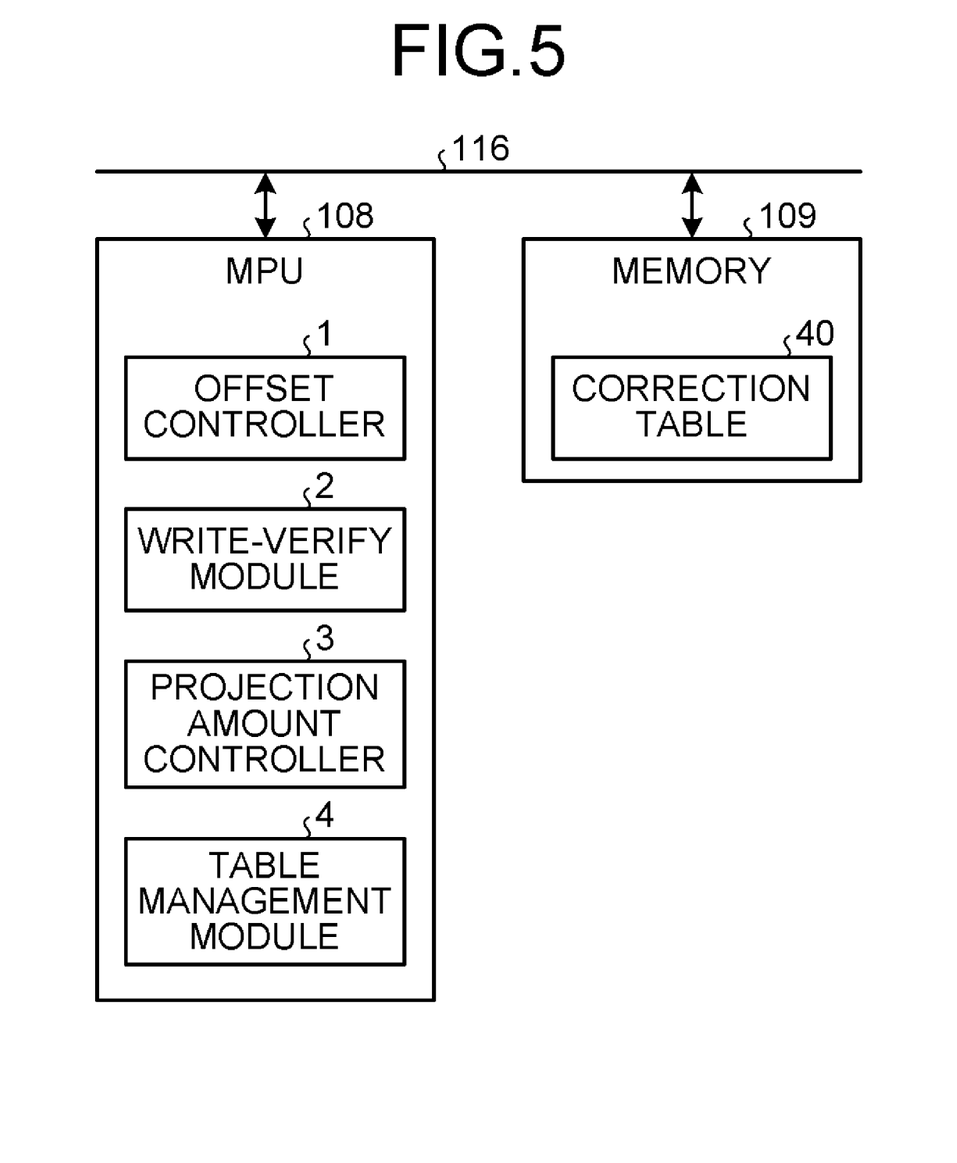
FIG. 5 is an exemplary block diagram of a functional configuration of an MPU in the embodiment.

FIG. 5 is an exemplary block diagram of a functional structure of the MPU 108. As illustrated in FIG. 5, functions realized by executing the firmware program of the MPU 108 comprise an offset controller 1, a write-verify module 2, a projection amount controller 3, and a table management module 4.

Prior to checking by the write-verify module 2, the offset controller 1 controls the projection amount of the head 114 by adding an offset value to a current in a steady state, supplied to a conductive body such as the heater 60 and the recording coil 53.

The write-verify module 2 executes a write-verify check to check whether the content written in any location on the magnetic disk 202 by the head 114 is correct when rotation of the magnetic disk 202 is started upon the power being turned ON or upon a request for restoration from the rotation-stopped state of the magnetic disk 202.

If the content is correct as a result of checking by the write-verify module 2, the projection amount controller 3 controls the projection amount of the head 114 by adding a first value to the current in the steady state, supplied to the conductive body such as the heater 60 and the recording coil 53. If the content is not correct as a result of checking, the projection amount controller 3 controls the projection amount of the head 114 by adding a second value with an absolute value greater than that of the first value to the current in the steady state, supplied to the conductive body such as the heater 60 and the recording coil 53.

The table management module 4 manages registration of a set value into the correction table 40 stored in the memory 109 and reading of a set value from the correction table 40 stored in the memory 109. The correction table 40, as illustrated in FIG. 6, comprises a normal correction table T1, an active correction table (for temperature other than low temperature) T2, and an active correction table (for low temperature) T3. The normal correction table T1 sets a first value having a small adjustment amount. The active correction table (for temperature other than low temperature) T2 is used when the temperature is not low, and sets a value having a large adjustment amount and an absolute value greater than that of the first value. The active correction table (for low temperature) T3 is used when the temperature is low, and sets a value having a large adjustment amount and an absolute value greater than that of the first value. The values stored in the active correction table (for temperature other than low temperature) T2 and the active correction table (for low temperature) T3 are values (second values) having absolute values greater than that of the first value. However, the values are changed depending on whether the measured temperature is equal to or less than a set temperature threshold. In the tables T1, T2, and T3, for example, O/S addition values, Iw addition values, read heater power addition values, and write heater power addition values are registered at every application time.

An addition process executed by the MPU 108 at the start-up based on the firmware program is described below with reference to the flowcharts in FIGS. 7 and 8.

Figure 7:
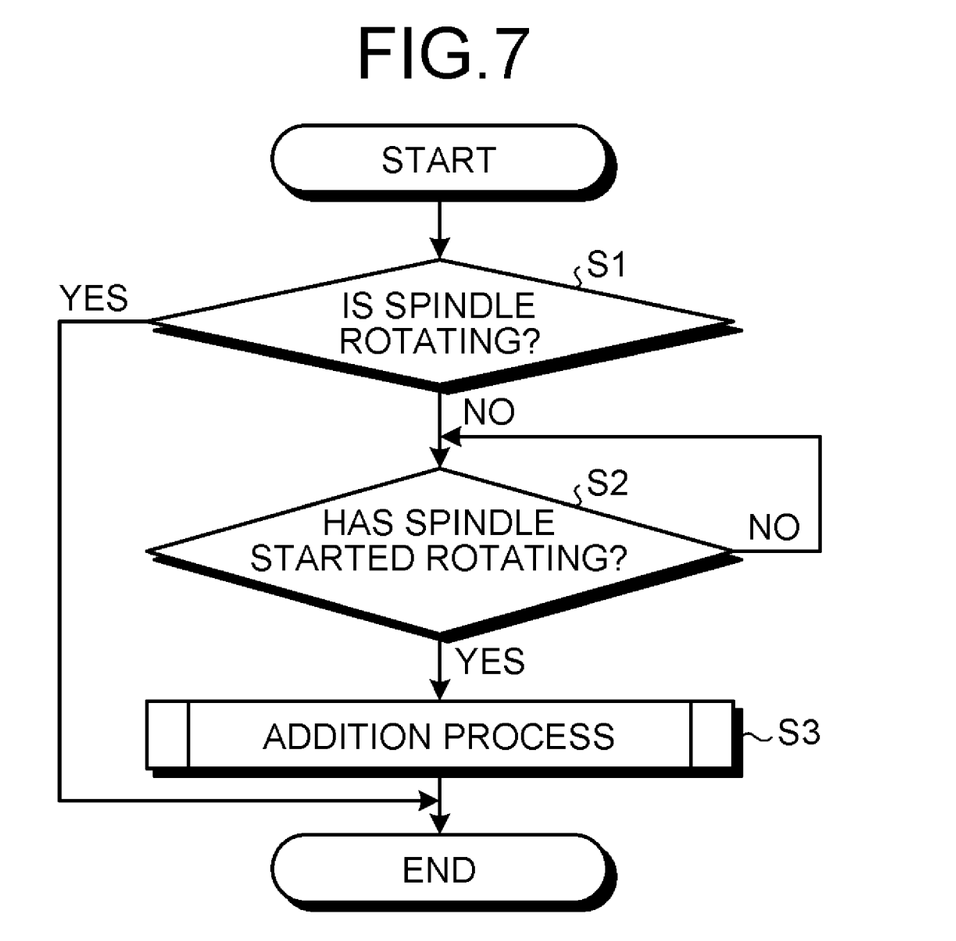
FIG. 7 is an exemplary flowchart of addition process in the embodiment.
Figure 8:
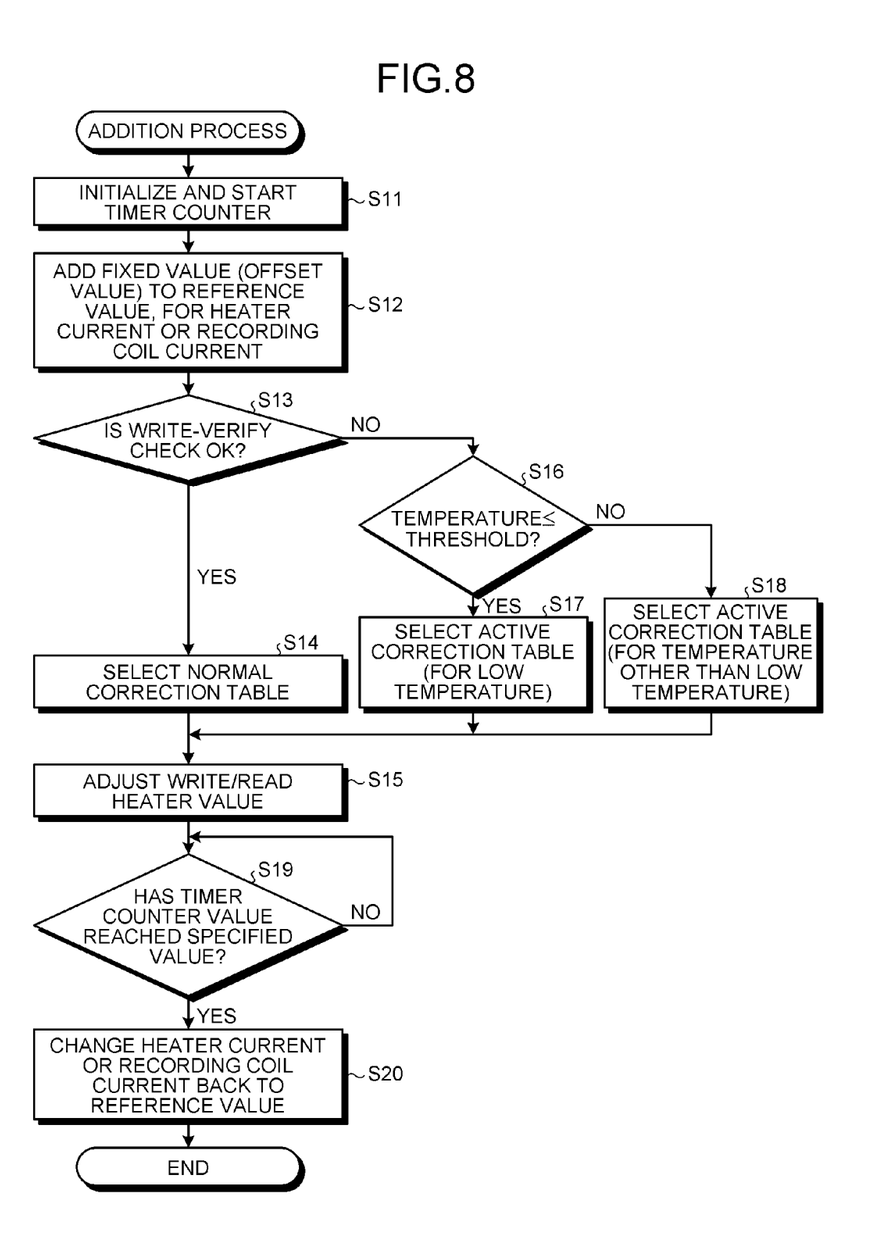
FIG. 8 is an exemplary flowchart of processing carried out at S3 in the embodiment.

As illustrated in FIG. 7, the MPU 108 checks the operation of the spindle motor 201 when the rotation of the magnetic disk 202 is started upon the power of the magnetic disk device 100 being turned ON or upon a request for restoration from the rotation-stopped state of the magnetic disk 202 such as from a power saving mode (S1).

The MPU 108 ends the processing if the spindle motor 201 is rotating (Yes at S1).

When the spindle motor 201 is in the stopped-state (No at S1), the MPU 108 determines whether the spindle motor 201 starts to rotate (S2).

If the spindle motor 201 starts rotating (Yes at S2), the MPU 108 starts the addition process, which will be described later (S3).

If the magnetic disk device 100 is connected to the upper device via a small computer system interface (SCSI), the magnetic disk device 100 receives a Start Unit command from the upper device. Accordingly, the addition process can be started upon receiving the command. Similarly, if the magnetic disk device 100 is connected to the upper device via a Serial Attached SCSI (SAS), the magnetic disk device 100 may receive a Start Unit Notify command in addition to the command mentioned above. Consequently, the addition process may be started upon receiving these commands. In this manner, the addition process may be started based on the command issued from the upper device at the same time when the spindle motor starts rotating.

The addition process here is a process of setting the current carried by the heater 60 and the recording coil 53 to be higher than the current suitably set for the steady state, over a predetermined period of time and upon receiving the factors mentioned above. In other words, the current generating the projection amount of the head 114, which is equivalent to a difference between the floating amount of the head 114 immediately after the start-up of the magnetic disk device 100 and the floating amount of the head 114 in the steady state, is added to the amount of current in the steady state.

As a specific addition method, the addition amount registered in the correction table 40 is added to the current in the steady state. However, it is not limited thereto. A value obtained by adding the above-mentioned value to the value used in the steady state may be stored in the magnetic disk device 100 in advance, and the obtained value may be selected and used. The addition process is carried out by changing the value of a register or the like in which the current of the heater is set based on the instruction from the MPU 108.

The processing at S3 is described below with reference to FIG. 8. As illustrated in FIG. 8, the MPU 108 stores a timer counter value indicated by the timer counter 117 at the time of the addition process in the memory, or performs initialization by temporary initializing the timer counter 117 and then restarting the timer counter 117 (S11).

The MPU 108 then adds a fixed value (offset value) to the current in the steady state (reference value) as the heater current carried by the heater 60 or of the recording coil current carried by the recording coil 53, offsets the write/read heater value, and enhances the floating and elevation of the head 114 (S12). In this manner, the deterioration of the start-up characteristics is enhanced. The offset value added to the write/read heater value must be a value not exceeding the error level during a write-verify period, which will be described later. For example, the head 114 can be elevated by as much as approximately 0.5 nanometers by adding approximately −5 bits. In this case when the head 114 is elevated by approximately 0.5 nanometers, the possibility of exceeding the error level is small for the normal drive.

Figure 9:
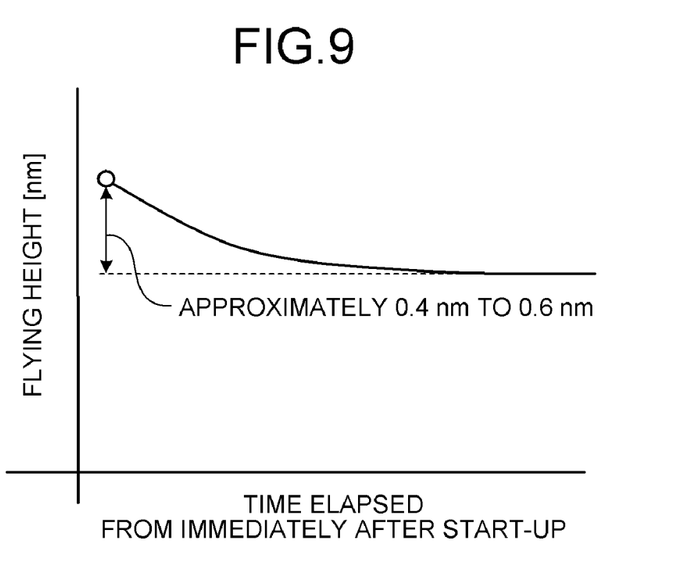
FIG. 9 is an exemplary graph illustrating a change in a floating amount of the head over time in the embodiment.
Figure 10:
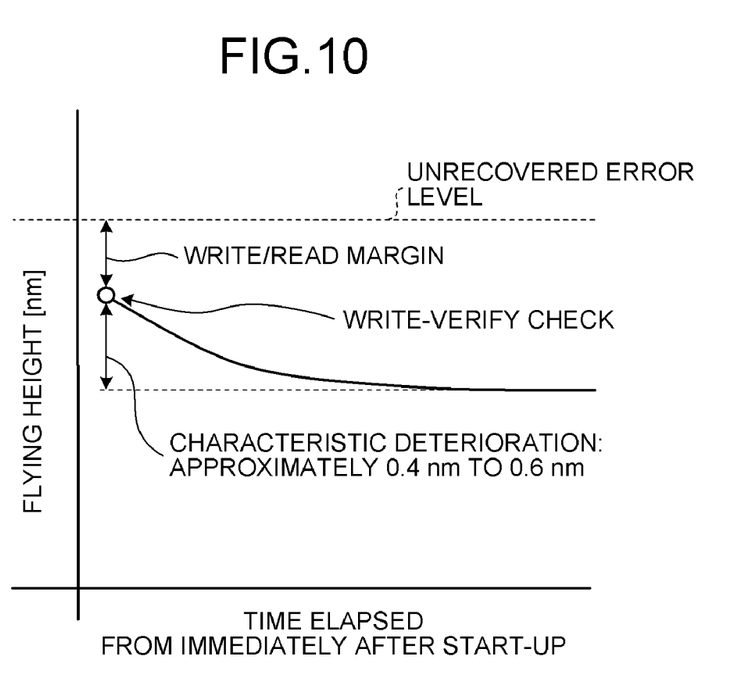
FIG. 10 is another exemplary graph illustrating the change in the floating amount of the head over time in the embodiment.

The reason for performing such processing at S12 is as follows. In the start-up state immediately after the start-up (immediately after the power is turned ON, or equal to or more than t[min] has passed since the magnetic disk device is unloaded), if the write/read heater value is adjusted by adding a predetermined value to the current in the steady state (reference value) as the heater current carried by the heater 60 or of the recording coil current carried by the recording coil 53, start-up characteristics can be enhanced by elevating the head 114 by approximately from 0.4 to 0.6 nanometers as illustrated in FIG. 9. Accordingly, by exceeding the error level during the write-verify period, which will be described later, the degree of characteristic deterioration can be isolated. However, because the magnetic disk device has a write/read margin as illustrated in FIG. 10, depending on the value of the write/read margin, it is not possible to reach the error level just by changing the head 114 by approximately from 0.4 to 0.6 nanometers. Consequently, an error is not caused by the write verify.

Figure 11:
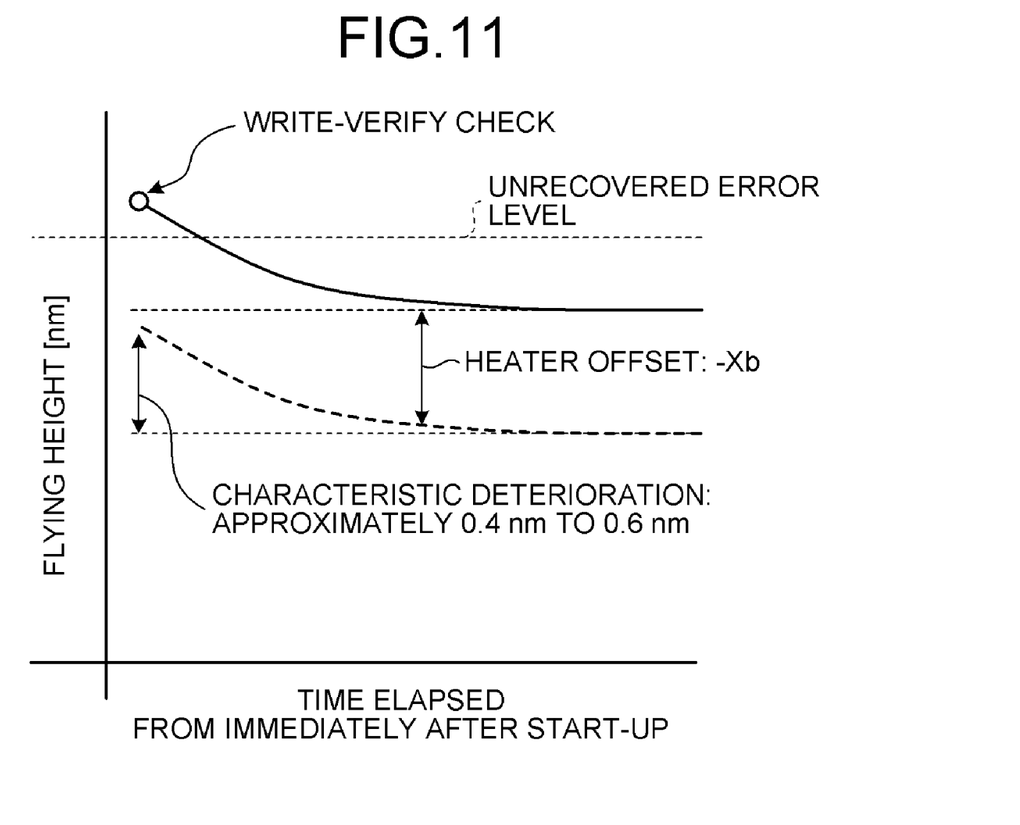
FIG. 11 is an exemplary graph illustrating a change in the floating amount of the head over time when an offset value is added in the embodiment.

In the magnetic disk device 100 according to the embodiment, in the start-up state immediately after the start-up, as illustrated at S12, the write/read heater value is adjusted by adding a fixed value (offset value) to the current in the steady state (reference value) as the heater current carried by the heater 60 or the recording coil current carried by the recording coil 53. Accordingly, as illustrated in FIG. 11, start-up characteristics can be enhanced by offsetting the write/read heater value and enhancing the floating and elevation of the head to exceed the error level during the write-verify period.

Referring back to FIG. 8, the MPU 108 executes the write-verify check on any location of the magnetic disk 202 (S13). In other words, the MPU 108 checks whether the content written by the head 114 is correct, and determines the degree of characteristic deterioration using read OK or NG.

As a result of the write-verify check, if the MPU 108 determines read OK (Yes at S13), the MPU 108 selects the normal correction table T1 having a small adjustment amount from the correction table 40 (S14). The MPU 108 then adjusts the write/read heater value by adding the adjustment amount (first value) in the normal correction table T1 (S15).

As a result of the write-verify check, if the MPU 108 determines read NG (No at S13), the MPU 108 then determines the temperature (S16).

If the temperature is equal to or less than the set temperature threshold (Yes at S16), the MPU 108 selects the active correction table T3 for low temperature having a large adjustment amount from the correction table 40 (S17). The MPU 108 then adjusts the write/read heater value by adding the adjustment amount (second value) in the active correction table (low temperature) T3 having an absolute value greater than that of the first value (S15).

If the temperature is not equal to or less than the set temperature threshold (No at S16), the MPU 108 selects the active correction table T2 for temperature other than the low temperature having a large adjustment amount from the correction table 40 (S18). The MPU 108 then adjusts the write/read heater value by adding the adjustment amount (second value) of the active correction table (for temperature other than the low temperature) T2 having an absolute value greater than that of the first value (S15).

As described above, in the start-up state immediately after the start-up (immediately after the power is turned ON, or equal to or more than t[min] has passed since the magnetic disk device is unloaded), a fixed value (offset value) is added to the current in the steady state (reference value) as the heater current carried by the heater 60 or the recording coil current carried by the recording coil 53. The write/read heater value is then adjusted by adding the adjustment amount corresponding to the result of the write-verify check and the temperature. Accordingly, the writing elements (recording coil 53 and recording core 54) and the reading element 55 are projected toward the magnetic disk 202, thereby appropriately maintaining the clearance 74 between the head 114 and the magnetic disk 202. Consequently, the characteristics of the writing process and the characteristics of the reading process can be improved.

Finally, the MPU 108 confirms how long the time has elapsed, e.g., 10 minutes, from when the rotation of the spindle motor 201 of the magnetic disk device 100 has started, or from when a specific command issued from the upper device at the start of operation is received, up to when the writing process can be started with the floating amount of the head using the amount of current in the steady state (S19).

In the confirmation method, the timer counter value is checked at regular intervals to check whether the timer counter value is a value indicating that the time described above has elapsed, or whether the difference between the timer counter value and the value stored in the memory is a value similarly indicating that the time described above has elapsed. The time interval to confirm the timer counter value can be suitably changed depending on the operation state and the loading state of the magnetic disk device 100. It is also possible to send an interruption notification to the MPU 108 when a certain period of time has elapsed.

When recognizing that a predetermined time has elapsed by using the method described above (Yes at S19), the MPU 108 changes the current carried by the heater 60 or the recording coil 53 to the current in the steady state (S20). In the changing process, similarly to S11, the change is performed by setting the changed value in the register or the like.

By using the methods described above, the floating amount of the head 114 can be set to a suitable value even during a period when the environmental temperature is different from that in the steady state, for example, immediately after the start-up of the magnetic disk device 100. The floating amount of the head 114 can also be set to a suitable value without performing any special operation in the steady state. Accordingly, it is possible to readily prevent errors from occurring in the writing process of data or the like to the magnetic disk 202. As a result, it is possible to enhance the reliability of the storage device.

In the magnetic disk device 100 according to the embodiment, if the rotation of the magnetic disk 202 is started upon the power being turned ON or upon a request for restoration from the rotation-stopped state of the magnetic disk 202, the write-verify check is executed to check whether the content written in any location on the magnetic disk 202 by the head 114 is correct. If the content is correct as a result of checking, the projection amount of the head 114 is controlled by adding the first value to the current in the steady state supplied to the conductive body (heater 60 or recording coil 53). If the content is not correct as a result of checking, the projection amount of the head 114 is controlled by adding the second value having the absolute value greater than that of the first value to the current in the steady state supplied to the conductive body (heater 60 or recording coil 53). Accordingly, the head 114 whose characteristics deteriorate can be distinguished immediately after the start-up. This is possible by using the write verify and checking the degree of deterioration in the write/read characteristics caused by the elevation of the floating position of the head 114 when the lubricant agent 73 for the magnetic disk 202 or the like sticks to the head 114 immediately after the start-up (immediately after the start-up of the device that has been left unpowered or unloaded for several hours). It is also possible to control the projection amount of the head 114 by adding a value corresponding to the characteristic deterioration to the current in the steady state supplied to the conductive body (heater 60 or recording coil 53). Consequently, the accuracy of distinguishing the head 114 whose characteristics deteriorate immediately after the start-up is improved, thereby preventing the deterioration in the write/read characteristics caused by the elevation of the floating position of the head more effectively than before.

The firmware program executed by the magnetic disk device 100 according to the embodiment may be provided by being stored in a computer-readable recording medium, such as a compact disk-read only memory (CD-ROM), a flexible disk (FD), a compact disk-recordable (CD-R), and a digital versatile disk (DVD), in a file of an installable form or an executable form.

The firmware program executed by the magnetic disk device 100 according to the embodiment may be stored in a computer connected to a network such as the Internet, and provided by being downloaded through the network. The firmware program executed by the magnetic disk device 100 according to the embodiment may also be provided or distributed through the network such as the Internet.

The firmware program executed by the magnetic disk device 100 according to the embodiment has a module structure comprising the modules described above (the offset controller 1, the write-verify module 2, the projection amount controller 3, and the table management module 4). A central processing unit (CPU) (processor) as actual hardware reads the program from a read-only-memory (ROM) and executes the program so that the modules described above are loaded on a main storage device. Accordingly, the offset controller 1, the write-verify module 2, the projection amount controller 3, and the table management module 4 are provided on the main storage device.

Moreover, the various modules of the systems described herein can be implemented as software applications, hardware and/or software modules, or components on one or more computers, such as servers. While the various modules are illustrated separately, they may share some or all of the same underlying logic or code.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device, comprising:
a recording medium for recording data;
a driving module configured to drive and rotate the recording medium;
a head comprising a reader for reading data from the recording medium and a writer for writing data to the recording medium, and configured to float over the recording medium, wherein the recording medium is configured to be driven and rotated by the driving module;
a conductor on the head and configured to change a projection amount of the head relative to the recording medium by thermally expanding the head with heat due to an electrical current passing through the conductor;
a write-verify module configured to check whether content written in an location on the recording medium by the head is correct, after the driving module starts rotating the recording medium from a rotation-stopped state; and
a projection amount controller configured to control the projection amount of the head by adding a value corresponding to the check by the write-verify module to an electrical current in a steady state passing through the conductor, wherein the projection amount controller is configured to control the projection amount of the head by adding a first value to the electrical current in the steady state passing through the conductor if the content is correct according to the check by the write-verify module, and configured to control the projection amount of the head by adding a second value greater than the first value to the electrical current in the steady state passing through the conductor if the content is not correct according to the check by the write-verify module.

2. The storage device of claim 1, wherein the projection amount controller is configured to measure a temperature if the content is not correct according to the check, and to change the second value depending on whether the measured temperature is equal to or less than a set temperature threshold.

3. The storage device of claim 2, wherein the projection amount controller is configured to control the projection amount of the head based on a table comprising a correction table for setting the first value, a correction table for setting the second value used when the temperature is not low, and a correction table for setting the second value used when the temperature is low.

4. A method for controlling a projection amount of a head executed by a storage device comprising a controller and a conductor configured to change a projection amount of the head relative to a recording medium by thermally expanding the head with heat due to an electrical current passing through the conductor, the method executed by the controller and comprising:
executing a write-verify check to check whether content written in an location on the recording medium by the head is correct, after rotation of the recording medium is started from a rotation-stopped state; and
controlling the projection amount of the head by adding a value corresponding to the check by the write-verify module to a reference value corresponding to an electrical current in a steady state that passing through the conductor, wherein, the controlling is configured to control the projection amount of the head by adding a first value to the electrical current in the steady state passing through the conductor if the content is correct according to the write-verify check, and configured to control the projection amount of the head by adding a second value greater than the first value to the electrical current in the steady state passing through the conductor if the content is not correct according to the write-verify check.

* * * * *